KV₂₁₀  3.86
KV₁₀₀  18.1
VTF-VI  111
ASTM-VI  116

INVENTORS
GARY L. DRISCOLL
IRL N. DULING
DAVID S. GATES
ROBERT W. WARREN
BY
ATTORNEY

FIGURE 3
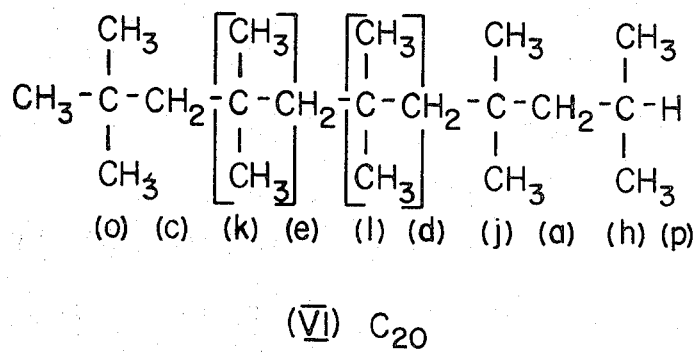
(VI) C₂₀
FIGURE 4
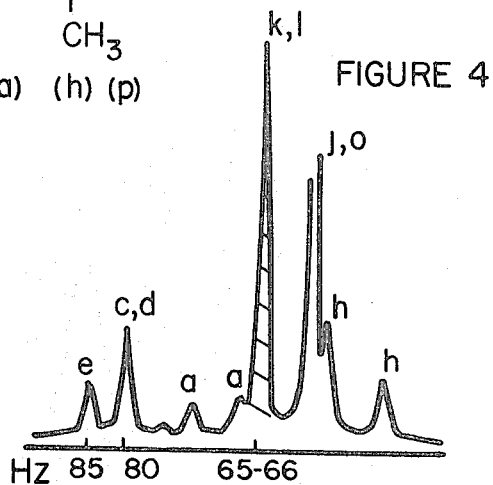
POLYISOBUTYLENE
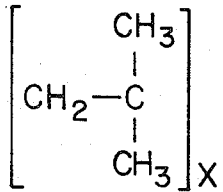
FIGURE 5
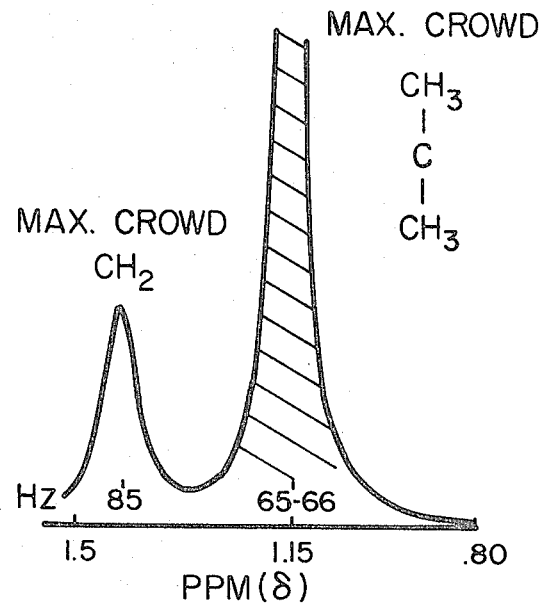
FIGURE 6
INVENTORS
GARY L. DRISCOLL
IRL N. DULING
DAVID S. GATES
ROBERT W. WARREN
BY
ATTORNEY (VII) $C_{23}$ IN $C_6D_6$ ($\overline{XIII}$) $C_{20}$ (XVI) C₄₀ IN C₆D₆
NMR SPECTRUM AT 220 MHz

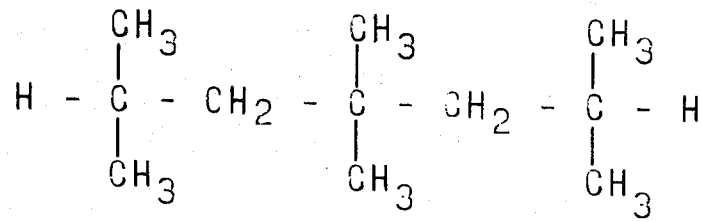
(p) (h) (a) (i) (a) (h) (p)
(I) $C_{11}$    FIGURE 11
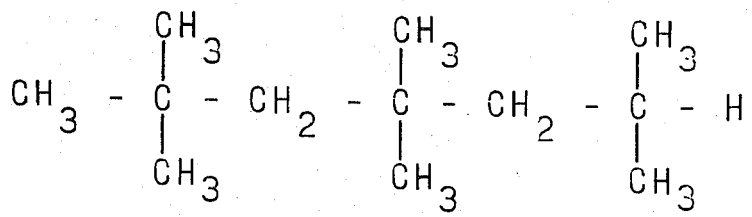
(o) (b) (j) (a) (h) (p)
(II) $C_{12}$    FIGURE 12
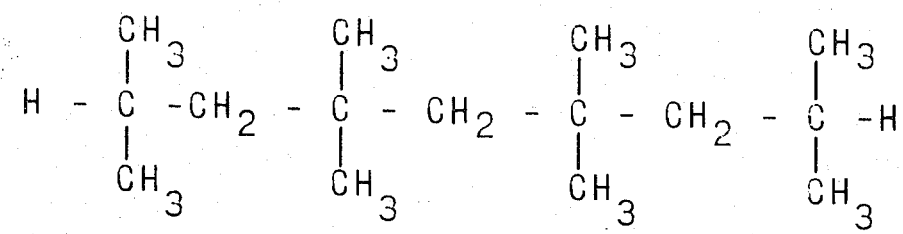
(p) (h)(a) (j) (b) (j) (a) (h)(p)
(III) $C_{15}$    FIGURE 13

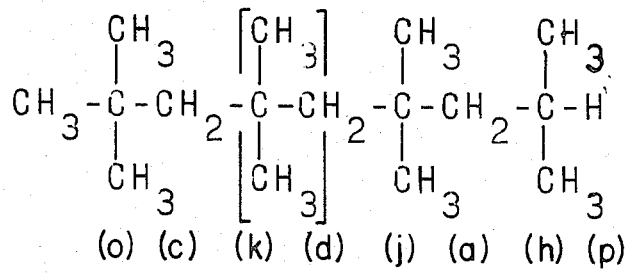
(IV) C₁₆ FIGURE 14
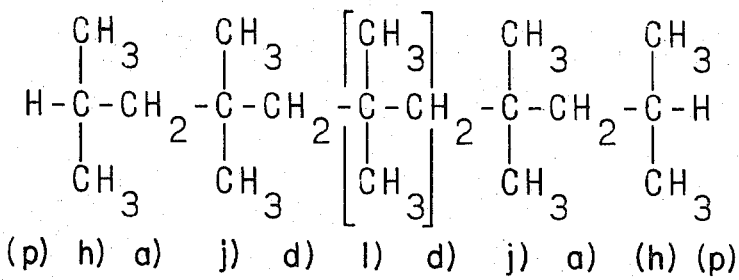
(V) C₁₉ FIGURE 15
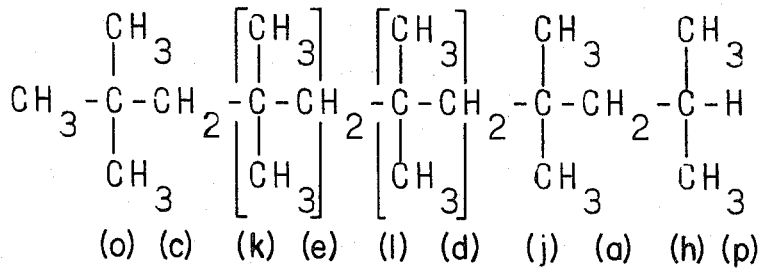
(VI) C₂₀ FIGURE 16
INVENTORS
GARY L. DRISCOLL
IRL N. DULING
DAVID S. GATES
ROBERT W. WARREN
BY
ATTORNEY

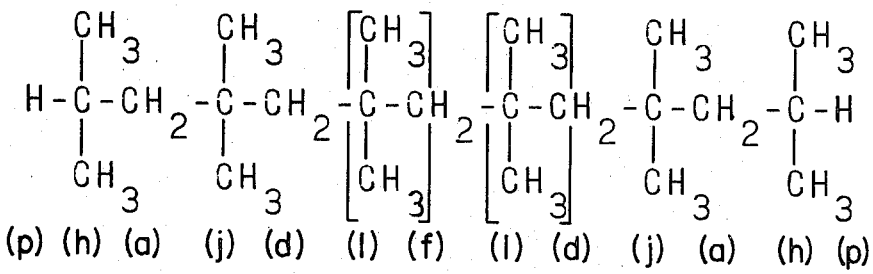
(VII) $C_{23}$ FIGURE 17
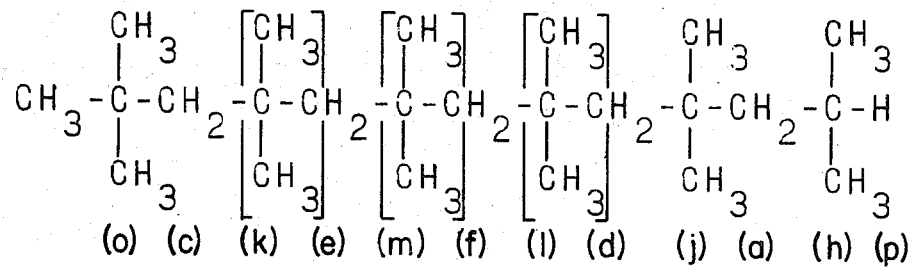
(VIII) $C_{24}$ FIGURE 18
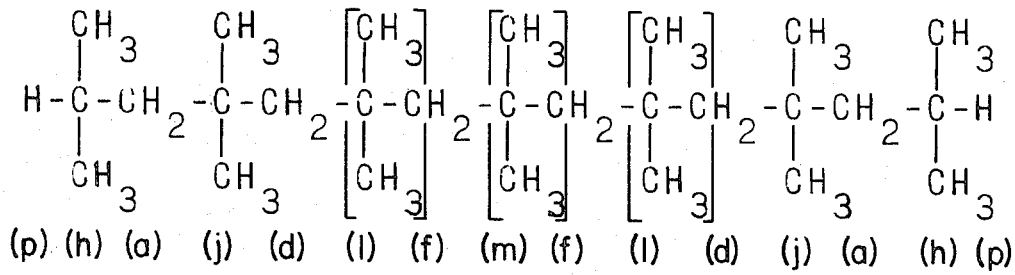
(IX) $C_{27}$ FIGURE 19

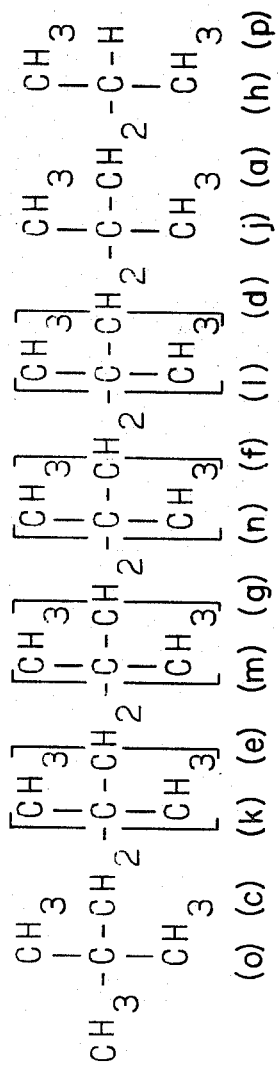
(X̄) C28 FIGURE 20
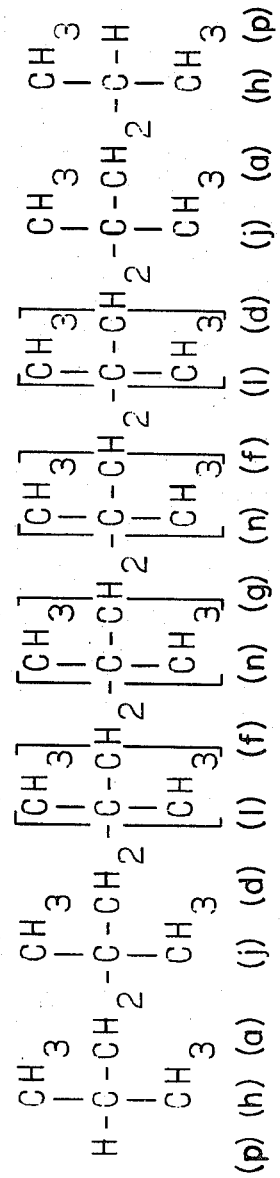
(X̄I) C31 FIGURE 21
INVENTORS
GARY L. DRISCOLL
IRL N. DULING
DAVID S. GATES
ROBERT W. WARREN
BY
ATTORNEY

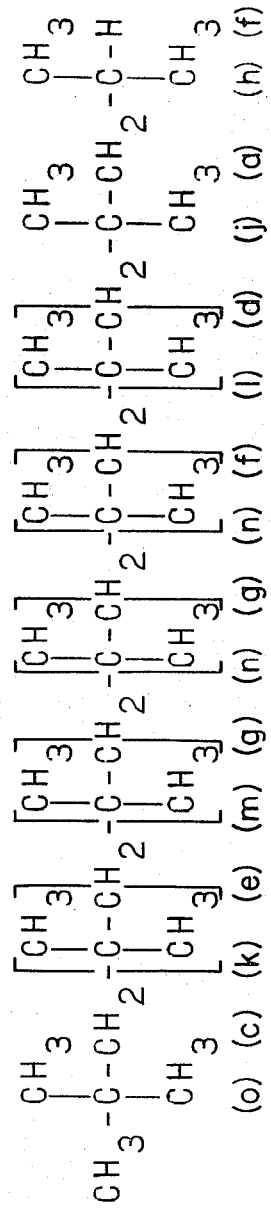

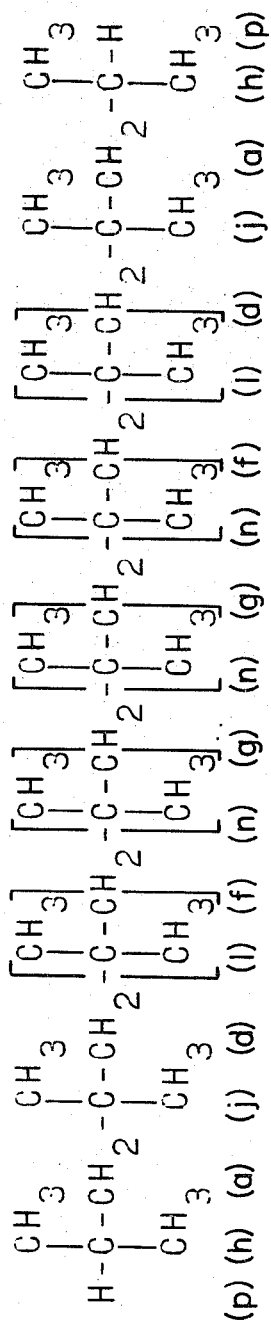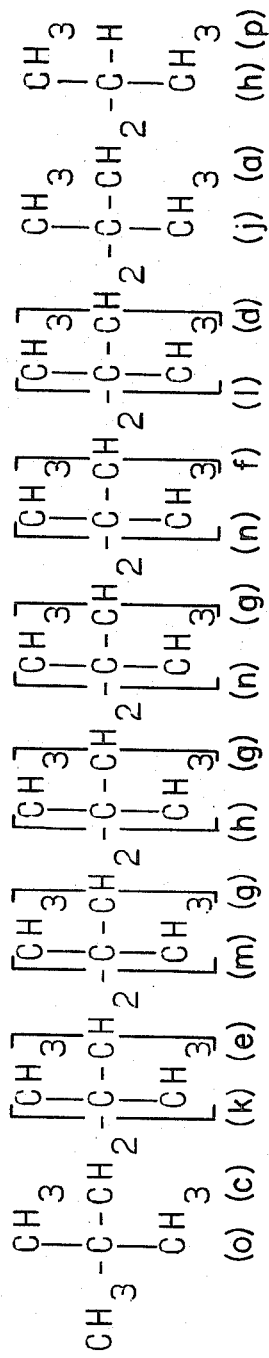

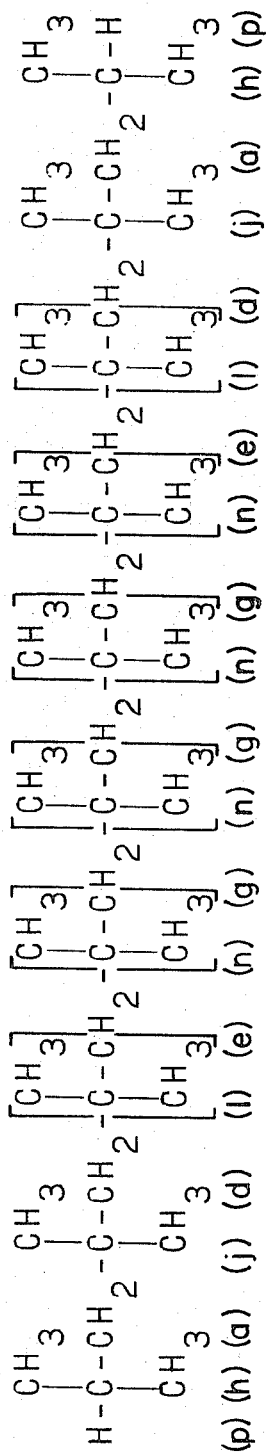
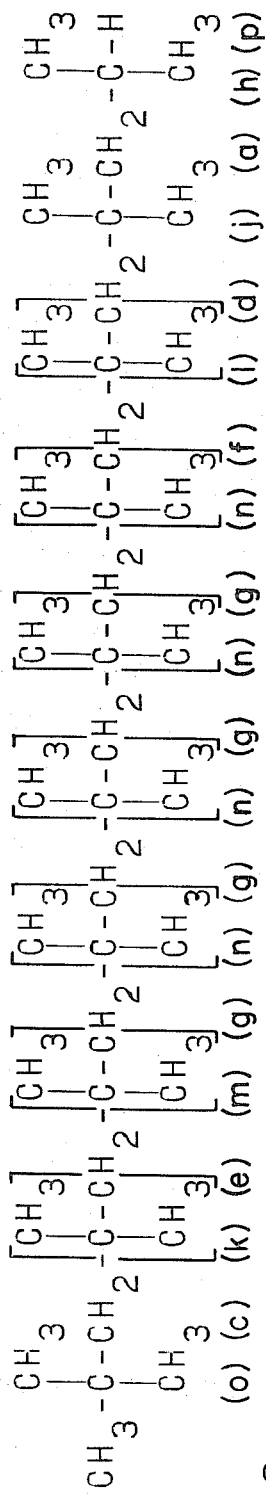

United States Patent Office 3,775,503
Patented Nov. 27, 1973

3,775,503
BRANCHED HYDROCARBONS IN THE $C_{16}$–$C_{40}$ RANGE HAVING MAXIMALLY CROWDED GEMINAL METHYL GROUPS
Gary L. Driscoll, Boothwyn, Irl N. Duling, West Chester, and David S. Gates, Swarthmore, Pa., and Robert W. Warren, Pitman, N.J., assignors to Sun Research and Development Co., Philadelphia, Pa.
Filed July 6, 1970, Ser. No. 52,300
Int. Cl. C07c 9/00
U.S. Cl. 260—676                9 Claims

ABSTRACT OF THE DISCLOSURE

Novel individual hydrocarbon species, useful as chemical intermediates or as components of traction fluids, can be obtained from the mixture of hydrocarbon fluids obtained from thermally cracking high molecular weight polyisobutylene. Other novel hydrocarbons are obtained by hydrogenation of the novel olefins. The unique character of these olefin and paraffin hydrocarbons can be proved by a combination of gas chromatography and nuclear magnetic resonance spectroscopy (NMR). This discovery involved the preparation and characterization of a homologous series, $C_{11}$ to $C_{40}$, of sixteen branched hydrocarbon species consisting of repeating isobutylene structures and proves that these hydrocarbons are unique species which are characterized by "crowded" and sterically hindered geminal methyl and isolated methylene groups.

CROSS REFERENCES TO RELATED APPLICATIONS

The present application is copending with the following listed applications, all of which are assigned to the Sun Oil Company, to whom the present application is also assigned:

Ser. No. 621,443 (now abandoned), filed Mar. 8, 1967—"Synthetic Lubricants from Low Molecular Weight Olefins"—Richard S. Stearns, Irl N. Duling, and David S. Gates;

Ser. No. 679,801 (now U.S. Pat. 3,597,358, issued Aug. 3, 1971), filed Nov. 1, 1967—"Traction Drive Transmission Containing Adamantane Compounds as Lubricant"—Irl N. Duling, David S. Gates, and Robert E. Moore;

Ser. No. 679,833 (now U.S. Pat. 3,595,796, issued July 27, 1971), filed Nov. 1, 1967—"Traction Drive Transmission Containing Npahthenes, Branched Paraffins, or Blends of Naphthenes and Branched Paraffins as Lubricant"— Irl N. Durling and David S. Gates;

Ser. No. 679,834 (now U.S. Pat. 3,595,797, issued July 27, 1971), filed Nov. 1, 1967—"Blending Branched Paraffin Fluids for Use in Traction Drive Transmission"—Irl N. Duling, David S. Gates, and Marcus W. Haseltine, Jr.;

Ser. No. 679,851 (now U.S. Pat. 3,598,740, issued Aug. 10, 1971), filed Nov. 1, 1967—"Traction Drive Transmission Containing Paraffinic Oil as Lubricant"—Irl N. Duling, David S. Gates, and Thomas D. Newingham;

Ser. No. 784,487 (now U.S. Pat. 3,646,224), filed Dec. 17, 1968—"Conversion of Adamantane Hydrocarbons to Monools"—Robert E. Moore;

Ser. No. 851,488 (now abandoned), filed Aug. 19, 1969—"Reaction of Alkyladamantane Compounds to Form Products Having Two Linked Adamantane Nuclei"—Robert E. Moore, and Abraham Schneider;

Ser. No. 3,256 (now U.S. Pat. 3,648,531, issued Mar. 14, 1972), filed Aug. 19, 1969—"Friction or Tractive Drive Fluid"—Irl N. Duling, David S. Gates, and Robert E. Moore;

Ser. No. 876,993 (now U.S. Pat. 3,645,902, issued Feb. 29, 1972), filed Nov. 14, 1969—"Friction or Tractive Fluid Comprising Adamantanes"—Irl N. Duling, David S. Gates, Robert E. Moore and Frederick P. Glazier;

Ser. No. 877,462( now abandoned), filed Nov. 17, 1969—"Combination of Traction Drive and Traction Fluid Comprising Saturated Cyclic Compounds"—Irl N. Duling, and Frederick P. Glazier;

Ser. No. 28,942, filed Apr. 15, 1970—"Process for Producing Polyisobutylene Oil"—Alfred E. Hirschler, and Gary L. Driscoll;

Ser. No. 52,301, filed July 6, 1970—"Polyisobutylene Oil Having a High Viscosity Index"—Gary L. Driscoll, Irl N. Duling, and David S. Gates.

The disclosure of all of the above-referred to applications is hereby incorporated herein by reference, particularly as to disclosure therein directed to the preparation of polyolefin oils, of compounds containing one or more adamantane nuclei, of hydrogenated oils, of saturated cyclic hydrocarbon oils or of branched chain acyclic hydrocarbon oils and to the blending of hydrocarbon components to produce traction fluids.

BACKGROUND AND SUMMARY OF THE INVENTION

Aligomers and high molecular weight polymers of isobutylene have been prepared commercially for a number of years (e.g. see R. H. Dyer, Symposium on Polybutene Oils, presented at a Special Session of Insulations Subcommittee (No. 5) IEEE Insulated Conductors Committee Meeting, Boston, Mass., Nov. 17, 1964). The above-referred to application Ser. No. 679,833, now U.S. Pat. No. 3,595,796 of Duling and Gates, disclosed that novel fluids prepared by thermally cracking high molecular weight polyisobutylene have physical properties different from those of commercial isobutylene oligomers. In particular, the "Duling-Gates" fluids, prepared by thermal cracking, had much better viscosity-temperature properties. The present application is in part directed to certain relatively non-volatile, novel individual acyclic olefin hydrocarbons which can be separated in relatively pure form from fluid mixtures prepared by thermally cracking high molecular weight polyisobutylene. Other novel individual paraffin hydrocarbons can be prepared by hydrogenation (to a Br. No. of 0) of these novel olefins. These novel paraffins can also be separated from a hydrogenated "Duling-Gates" fluid.

Certain of these novel olefins and paraffins (having carbon numbers, $C_{16}$, $C_{20}$, $C_{24}$ . . . $C_{40}$) can also be obtained from the novel oil described and claimed in the above-referred to application of Driscoll, Duling and Gates filed of even date herewith, or from the oils prepared by the process of the above-referred to application of Hirschler and Driscoll. The present application describes sixteen branched hydrocarbon species containing repeating isobutylene units and which are members of the homologous series $C_{11}$, $C_{12}$, $C_{15}$, $C_{16}$, $C_{19}$, $C_{20}$ . . . $C_{40}$. Tsuchiya and Sumi, J. Polym. Sci. (A–1) 7, 813–826 (1969), have characterized one of the highly volatile lower molecular weight oligomer species of this series (i.e., polyisobutylene trimer) by gas chromatographic retention time and boiling point data. Apart from this single characterization none of the series has heretofor been known to the art.

The novel olefin and paraffin hydrocarbons of this invention are useful as traction fluids, or as components of traction fluids. The novel olefins are also useful as chemical intermediates to prepare novel polar compounds (such as alcohols, acids, esters, ketones, thioketones, amides, amenes, thioesters, phosphate esters of the alcohols and thioesters). The ketones, and other non-acidic ozonolysis products can be useful as traction fluids or as components of traction fluids. Such derivatives, and their use as traction fluids or as anti-wear additives in lubricants are the invention of Gary L. Driscoll and Marcus W. Haseltine, Jr., and are the subject of a later filed application Ser. No. 135,295, filed Apr. 19, 1971.

NMR data combined with benzene-induced solvent shifts can be used to establish the structural composition of the nonvolatile fluids prepared by thermally cracking polyisobutylene. The "Duling-Gates" fluid is a mixture of odd and even carbon numbered species characterized by repeating isobutylene structures. Both type species in this series can arise from successive losses of isobutylene units from the stabilized tertiary radical resulting from the initiating chain cleavage. The oligomers in commercially available polyisobutylene fluids do not have the regular repeating structure of the fluids prepared by thermal cracking.

ILLUSTRATIVE EXAMPLES

In the following examples, gas chromatographic separations were obtained using F&M Models 720 and 5750 gas chromatographs and Model 775 Prepmaster. All of these instruments were equipped with dual columns and thermal conductivity detectors (W2 filaments). The chromatographic columns used with the analytical instruments consisted of 6 ft. and 24 ft. x ¼-inch O.D. copper tubing packed with 5.0% SE-54 silicone rubber on 60-80 mesh Chromosorb G (AW-DMCS), 8 ft. x ¼-inch O.D. copper tubing packed with 5.0% GE SE-30 silicone rubber on 60-80 mesh Chromosorb G 9AW-DMCS), and 6 ft. x ¼-inch O.D. copper tubing containing 10.0% Apiezon L grease on 60-80 mesh Chromosorb P (AW-DMCS). The 775 Prepmaster utilized an 80-inch x ¾-inch O.D. stainless steel column containing 20% UC W98 silicone rubber coated on 10-60 mesh untreated Chromosorb P. The 6 ft. and 25 ft. SE-54 columns were linear temperature-programmed from 90° to 300° C. at a program temperature rate of 7.5 to 8° C. per minute and were also run isothermally at temperatures ranging from 210 to 280° C. FIG. 1 shows the separation obtained for these species when temperature-programmed over the 6 ft. SE-54 silicone rubber column. The 6 ft. Apiezon L column was used in series with the 24 ft. SE-54 silicone rubber column and operated isothermally at temperatures of 125 and 270° C. Helium was used as carrier gas at a rate of 75 ml./min. for all analytical columns. The injection ports of the 720 and 5750 instruments were maintained at a temperature of 320° C. and the detectors at a temperature of 340° C. The 80-inch preparative column was operated at 250 to 300° C. and had a helium carrier gas flow rate of 370 ml./min. The 775 instrument had an injection port temperature of 335° C. and a detector temperature of 305° C.

A Perkin-Elmer Model 226 capillary gas chromatograph equipped with flame ionization detectors was used for purity determinations of collected fractions. The capillary columns used for this work consisted of a 150 ft. x 0.01-inch capillary columns of Apiezon L grease. The Ucon column was operated isothermally at temperatures ranging from 75 to 150° C. and at pressures of 20 to 30 p.s.i. The 50 ft. Apiezon L column was operated isothermally from 200 to 230° C. and at pressures of 20 to 25 p.s.i. The 150 ft. Apiezon L column was operated at 250° C. and 40 p.s.i. pressure.

The NMR spectra were obtained on Varian Models A-60 and HA-100 spectrometers. One NMR spectrum was obtained using the Varian Model HR-220. The 60-mHz. spectra were recorded of carbon tetrachloride, CCl$_4$, and hexadeuteriobenzene, C6D6, solutions containing 4 to 7% w./w. (weight percent) of sample and about 1% of tetramethylsilane, TMS. Resonance positions in Hz. and p.p.m. were measured relative to the internal reference, TMS, at ambient temperatures (33°±° C.).

The 60-mHz. spectra were run at sweep widths of 250 and 500 Hz. The 100-mHz. spectra of the C6D6 solutions were obtained using frequency sweep with the control signal locked on TMS. These spectra were recorded using a sweep offset of 72 Hz. and a sweep width of 100 Hz. The single 220-mHz. spectrum was obtained using a sweep width of 250 Hz. and an offset of 165 Hz. Integrated intensities of the resonance peaks were measured with the A-60 and HA-100, and HR-220 electronic integrators. Mass spectra were obtained using a Consolidated Electrodynamics Corporation Model 21-103C mass spectrometer equipped with a Microtek high temperature inlet and a Varian Vac-Ion pumping system. The spectra were run at ionizing voltages of 9 and 12 ev.

Refractive indices of collected fractions were obtained with a Bausch and Lomb Model "ABBE-3L" refractometer at 25° C. Molecular weights were obtained using a Mechrolab Model 301 vapor pressure isometer. Benzene was used as the solvent for all compounds examined. Densities at 25° C. were obtained for two collected fractions by using a microcapillary pycnometer calibrated with distilled water.

EXAMPLE I

A preparation of thermally-cracked polyisobutylene fluid

A "Duling-Gates" polyisobutylene fluid was prepared by thoroughly vacuum cracking (or "unzipping") commercial "Vistenex" polyisobutylene (having a number average molecular weight of 23,000) in a stirred, round bottom flask at about 375° C. and 1 mm. Hg. The product was taken overhead continuously with essentially no reflux or fractionation. The distillate products and traps were combined and cohobated (redistilled) to 100° C. at 0.3 mm. Hg and the more volatile distillate fractions discarded. The remaining less volatile, thermally cracked polyisobutylene "bottoms," which represented about 35 to 40% of the total charge, was hydrogenated in a 1 liter stainless steel hydrogenation reactor at 2500 p.s.i. hydrogen and 274° C. for six hours. The catalyst was 0.5% palladium on 4 to 8 mesh coconut charcoal. The product was then fractionally distilled under vacuum from 40° to 250° C. Distillate fractions covering the complete boiling range were taken as feed stocks from which individual hydrocarbon species could be recovered.

EXAMPLE II

Recovery and identification of individual hydrocarbons

The major branched hydrocarbon species of the distillate fractions were separated and isolated into chromatographic fractions of reasonably high purity by linear temperature programmed and isothermal gas chromatography. In most cases, chromatographic fractions representative of a single molecular species of each carbon number were obtained using the 6 ft. and 24 ft. SE-54 silicone rubber columns under isothermal conditions ranging from 210 to 280° C. In certain instances fractions consisting of hydrocarbons having several different carbon numbers were prepared using the 80-inch x ¾-inch preparative columns. These concentrates were then rechromatographed over the ¼-inch diameter analytical columns and pure chromatographic fractions of single carbon number species collected.

In the separation of the $C_{11}$ and $C_{12}$ hydrocarbon species, a 24 ft. SE-54 silicone rubber column was used in series with a 6 ft. Apiezon L column and was operated at 120° C. This same combination of columns was used for the separation of the $C_{23}$ and $C_{24}$ hydrocarbon species at 270° C. The purity of all chromatographic fractions was determined utilizing capillary gas chromatography. The 150 ft. Ucon capillary column was used for the examination of the $C_{11}$ to $C_{24}$ hydrocarbon species. The purity of the high molecular weight, $C_{27}$ to $C_{40}$, hydrocarbon species was determined with 50 ft. and 150 ft. Apiezon L capillary columns. The carbon numbers of these branched hydrocarbon species were determined using a combination of (1) relative gas chromatographic retention time data obtained using SE–54 and SE–30 silicone rubber columns, (2) the relative gas chromatographic rentention time of a reference branched $C_{16}$ hydrocarbon, (heptamethylnonane), (3) mass spectrometric data, (4) molecular weight data obtained using vapor pressure osmometry, and (5) integrated NMR data. The identification of all collected branched hydrocarbons, $C_{11}$ to $C_{40}$ species, was accomplished by NMR spectroscopy using 60–mHz., 100–mHz., and 220–mHz spectra obtained in both $CCl_4$ and $C_6D_6$ solvents.

EXAMPLE III

Determination of calculated and experimental physical property data

Refractive indices of pure collected fractions of each hydrocarbon species were obtained using a Bausch and Lomb refractometer at 25° C. Reference samples of heptamethylnonane and isooctane were used for calibration before each series of determinations. Calculated refractive indices were then obtained for each carbon number species using the Greenshields and Rossini method (Phys. Chem. 62, 271–280 (1958)) and compared with the experimental values. Calculated densities at 25° C. were also obtained for each carbon number species using this same method. The calculated densities of the $C_{35}$ and $C_{36}$ hydrocarbons were compared with the experimental values.

DESCRIPTION OF THE DRAWINGS

The gas chromatogram of the hydrogenated, thermally cracked polyisobutylene (or Duling-Gates Fluid) before fractionation is shown in FIG. 1 and illustrates the complexity of those relatively nonvolatile fluids. The series of peaks observed in this chromatogram represents a homologous series of two different basic classes of branched hydrocarbons. One class is symmetrical, has an odd number of carbon atoms, and is terminated with two isopropyl groups. The second species is non-symmetrical, consists of an even number of carbon atoms, and is terminated with an isopropal group and a tertiary butyl group. The incremental increase of carbon number for each series is due to an additional $C_4$, isobutylene, unit in the hydrocarbon chain. No significant amounts of the odd carbon numbered species which are terminated with two tertiary vinyl groups were found to be present in those nonvolatile fractions. The carbon number of each collected individual hydrocarbon component in the $C_{19}$–$C_{31}$ range is indicated in the gas chromatogram shown in FIG. 1. In the $C_{11}$ to $C_{40}$ range, the concentration of the $C_{11}$ and $C_{12}$ species were much lower relative to the concentration of higher carbon numbered species, probably due to the loss of a portion of these hydrocarbons to the volatile fractions. The purity and molecular weight data obtained for each collected hydrocarbon species, $C_{11}$ to $C_{40}$, are given in Table I. The purity of these fractions varied from 96.7 to 99+% and the calculated molecular weight of each carbon number species was in good agreement with the experimental molecular weight value obtained using vapor pressure osmometry.

The identity of these branched hydrocarbons as determined by NMR spectroscopy are indicated by the structural assignments (I) through (XVI) in FIGS. 11 through 26, respectively. In these formulas maximally "crowded" geminal dimethyl groups are enclosed in brackets. The observed resonance positions in $CCl_4$ and assignments for the methylene and methyl protons of this series of hydrocarbons are summarized in Tables II and III. Methyl and methylene protons of the same type and having the same degree of steric hinderance and "crowding" were found to have essentially the same chemical shifts in $CCl_4$ for each individual hydrocarbon species regardless of carbon number. Differentiation and assignment of a number of the maximally "crowded" methylene and maximally "crowded" geminal dimethyl groups in these compounds was possible from 100-mHz. spectra obtained using $C_6D_6$ solvent. The observed proton resonance positions for these groups in $C_6D_6$ and their assignments in the $C_{19}$ to $C_{40}$ hydrocarbon species are summarized in Table IV. The solvent change from $CCl_4$ to $C_6D_6$ not only resulted in magnetic nonequivalence of these "crowded" methylene and geminal dimethyl protons, but also gave widely differing negative $\Delta$ values for terminal and centrally located protons. Table V summarizes these results by showing the solvent shift date $$(\Delta \text{ p.p.m.}) = \alpha Cl_4 - \alpha C_6D_6$$

Figure 1:
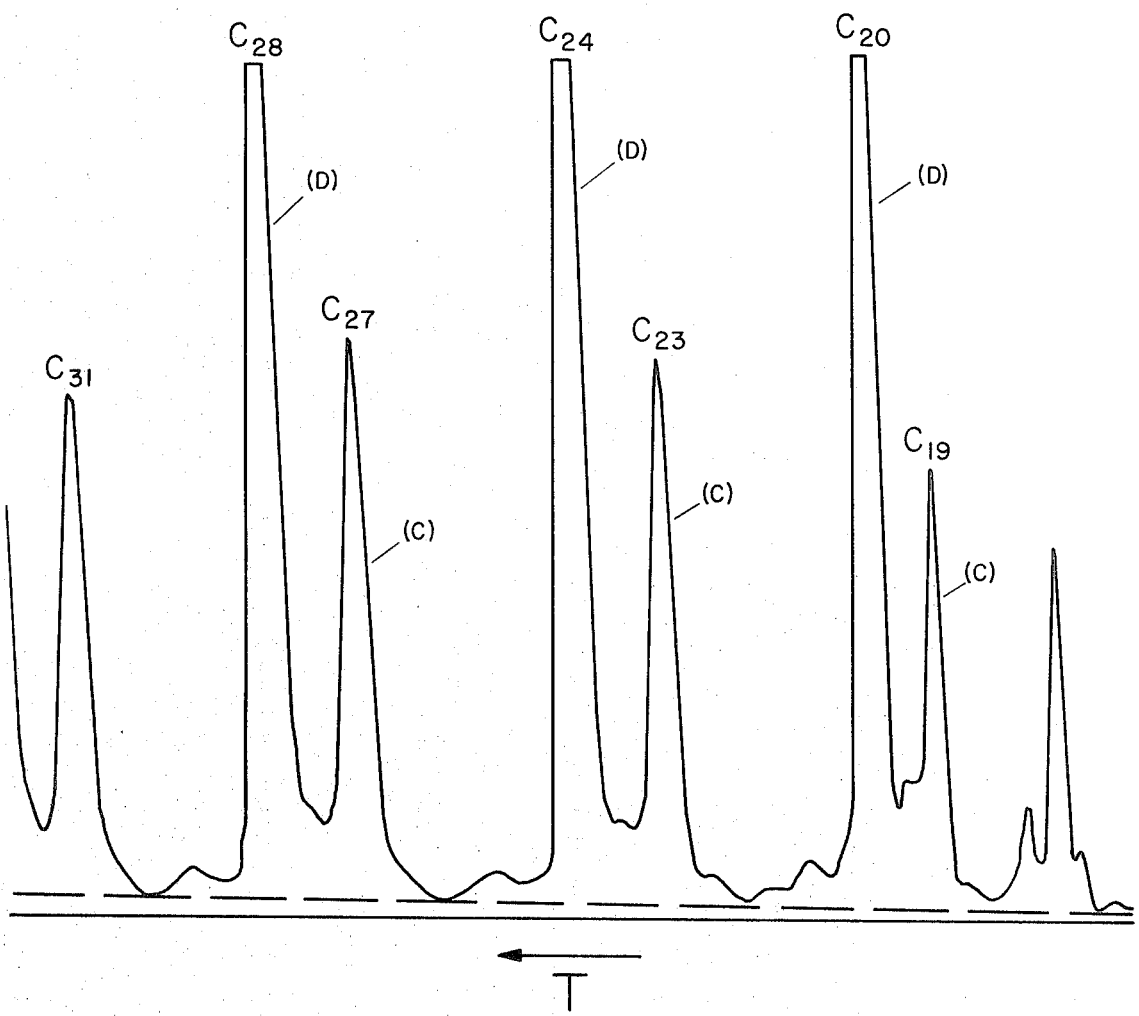

obtained from the 60-mHz. spectra of the $C_{11}$ to $C_{40}$ hydrocarbon species in these two solvents.

To show the effects of various aromatic solvents on these hydrocarbons, the chemical shifts of the maximally "crowded" methylene protons were determined for a mixture of $C_{31}$ to $C_{36}$ species in a number of differently substituted benzenes and in pyridine. The data indicate that the aromatic-induced solvent shifts for these hydrocarbon species are influenced by the diamagnetic anisotropy of the aromatic solvent used.

Table VI gives the refractive indices determined at 25° C. for the $C_{11}$ to $C_{40}$ hydrocarbon species. These values are compared with the calculated values obtained for these compounds using the Greenshields and Rossini method. The difference in refractive indices, $\Delta RI$ (calculated minus experimental), was found to increase with increasing carbon number. Included also in this table are density values which were obtained from the calculated molal volumes (25° C.) of these hydrocarbon species and two experimental density values which were determined for the $C_{35}$ and $C_{36}$ species. Positive deviations between calculated and observed density values were found for the $C_{35}$ and $C_{36}$ hydrocarbon species.

FURTHER DESCRIPTION OF THE INVENTION

The novel branched hydrocarbon species characterized by "crowded" and sterically hindered methyl and methylene groups. This crowding effect, although somewhat less pronounced in the lower carbon number species, becomes significantly greater with an increase in the carbon chain. The introduction of methylenes between two intergnal geminal methyl groups or between an internal geminal methyl and a t-butyl group ($\alpha$ to each group) causes significant bending of the hydrocarbon chain. This bending results in much greater "crowding" and steric hinderance of the various protons which in turn restricts free rotation of the individual methylene and geminal methyl groups. Resulting anisotropy changes cause a downfield chemical shift of their proton resonance signals. This shift can be attributed to van der Waals repulsions of hydrogen nucleii and is influenced by the relative degree of "crowding" experienced by the individual methylene and methyl protons.

The lower limit of this downfield shift in branched paraffins ($CCl_4$ solutions) is 66 Hz. (1.10 p.p.m.) for internal geminal methyls and 85 Hz. (1.42 p.p.m.) for isolated methylenes. This occurs in the polymer, polyisobutylene, where the repeating isobutylene unit provides maximum "crowding" of both the geminal methyl and the isolated methylene groups. We have found that the lower carbon number, $C_{11}$, $C_{12}$, and $C_{15}$, branched hydrocarbon species have no maximally "crowded" geminal methyl groups. The single geminal methyl in the $C_{11}$ species (I) has some degree of "crowding" and is defined here as partially "crowded." This group gives a resonance singlet peak at 0.87 p.p.m. The resonance is shifted slightly downfield from the resonance singlet of a "normal" uncrowded geminal methyl at 0.81–0.83 p.p.m. The two methylene groups in this compound give a doublet resonance signal which corresponds to "uncrowded" methylenes of a branched chain. The $C_{12}$ and $C_{15}$ species (II) and (III) respectively, have geminal methyl group which are more sterically hindered than the geminal methyl of the $C_{11}$ species. These methyls ($j$) are "crowded" methyl groups and give a resonance singlet which is shifted to lower field and appears at 0.98–1.0 p.p.m. The $C_{12}$ species as all of the even carbon numbered species in this series of compounds has a "crowded" t-butyl group. The "crowded" t-butyl and "crowded" internal geminal methyls in these molecules cause a downfield shift of the resonance signal of the single methylene ($b$) between them ($\alpha$ to each group). Methylene groups having this environment are defined as being slightly "crowded" and are found in only the $C_{12}$ and $C_{15}$ hydrocarbon species. Their characteristic resonance which appears at 75 Hz. (1.25 p.p.m.) is not observed in the NMR spectra of any of the other branched hydrocarbon species.

The $C_{16}$ hydrocarbon species (IV) is characterized by having both "crowded" and maximally "crowded" geminal methyl groups. This is the first molecular species in this series of compounds which has maximum "crowding" of a geminal methyl group. A geminal methyl group has maximum "crowding" when it is (1) adjacent, $\alpha$, to two isolated methylene groups, and (2) beta, $\beta$, to two quaternary carbon atoms. This "crowding" is comparable to the maximum "crowding" of geminal methyls of polyisobutylene. The resonance signal for the maximally "crowded" geminal methyl in (IV) like the resonance signal for the maximally "crowded" geminal methyls of polyisobutylene is shifted downfield and appears at 65–66 Hz. (1.08–1.10 p.p.m.). The two isolated methylenes ($c$) and ($d$) in this molecule (referred to as the terminal isolated methylenes in the longer carbon chain species) are both adjacent to a maximally "crowded" geminal methyl group and are, therefore, more sterically hindered and "crowded" than the isolated methylenes ($b$) of the $C_{12}$ and $C_{15}$ species. This increased methyl "crowding" causes a 5 Hz. downfield shift of the methylene resonance to 80 Hz. (1.33 p.p.m.), where one single resonance peak is observed for both isolated terminal methylene groups. These methylene groups are defined as "crowded" methylenes and are found in all of the higher carbon number species ($C_{16}$ and above). This is a new correlation for methylene protons which was not included in the methylene chemical shift data presented for a large number of hydrocarbons by Bartz and Chamberlain (Anal. Chem. 36, 2151–58 (1964)). Although a single resonance at 1.33 p.p.m. ($CCl_4$ solution) confirms that these methylenes have essentially the same degree of "crowding," the structure of the $C_{16}$ molecule (IV) indicates that these two methylene groups have slightly different molecular environments and should therefore be magnetically nonequivalent and give two separate proton resonance signals in NMR. The use of $C_6D_6$ as the NMR solvent resulted in a slight broadening of this methylene resonance peak indicating magnetic nonequivalence of these two methylene groups. NMR examinations of the higher, even carbon numbered species (those terminated with both a t-butyl and isopropyl group) in $C_6D_6$ solvent revealed in every case two distinct, separate signals for the terminal isolated methylene groups ($c$) and ($d$) thus confirming their magnetic nonequivalence.

The $C_{19}$ hydrocarbon species is the only other compound in this series which has a single maximally "crowded" geminal methyl group. This molecular species (V), which is symmetrical about the maximally "crowded" geminal methyl group, has two isolated methylenes ($d$) having exactly the same molecular environment. These groups are, therefore, magnetically equivalent. The NMR spectrum of the $C_{19}$ species in both $CCl_4$ and $C_6D_6$ solvents show a single proton resonance peak for these "crowded" methylenes. All of the odd carbon numbered species in this series are characterized by this molecular symmetry and have terminal isolated "crowded" methylene groups which are identical. The unsymmetrical $C_{20}$ hydrocarbon species (VI), FIG. 3, is the first species of this hydrocarbon series which has a maximally "crowded" methylene group. An isolated methylene group has maximum "crowding" when it is adjacent to, or between, two maximally "crowded" geminal methyl groups such as in polyisobutylene. FIGS. 4 and 6 are, respectively, the NMR spectra (in $CCl_4$ solution at 60 mHz.) of the $C_{20}$ species and the NMR spectrum of high molecular weight polyisobutylene (FIG. 5). The nonequivalence of the terminal isolated methylene groups ($c$) and ($d$), in this compound, as in the $C_{16}$ species, was confirmed using $C_6D_6$ as the NMR solvent.

The subsequent higher carbon numbered novel hydrocarbons ($C_{23}$ (VIII)) to $C_{40}$ (XVI) have an increasing number of maximally "crowded" geminal methyl and maximally crowded methylene groups, and consist of two basic species (1) an odd carbon numbered species terminated with two isopropyl groups and symmetrical about either a maximally "crowded" geminal methyl group or a maximally "crowded" methylene groups and (2) an even carbon numbered species terminated with both an isopropyl and t-butyl group and without a center of symmetry. The $C_{22}$ and $C_{24}$ species are illustrated below where A refers to maximally "crowded" geminal methylene groups and B corresponds to maximally "crowded" methylene groups.

(1) 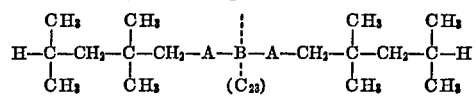

and (2) 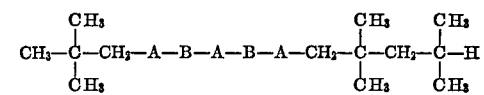

Integrated intensities of the observed resonances for each carbon number species were consistent for the theoretical number of maximally "crowded" methylenes and maximally "crowded" geminal methyls predicted for each assigned structure. This is illustrated by the data given in Table VII which compares the calculated and experimental values obtained for the various proton resonances of the $C_{27}$ and $C_{28}$ hydrocarbon species. The number of maximally "crowded" geminal methyl and maximally "crowded" methylene groups for the $C_{16}$ to $C_{40}$ species are summarized in Table VIII. The number of maximally "crowded" methylene groups is always one less than the number of maximally "crowded" geminal methyl groups.

Figure 8:
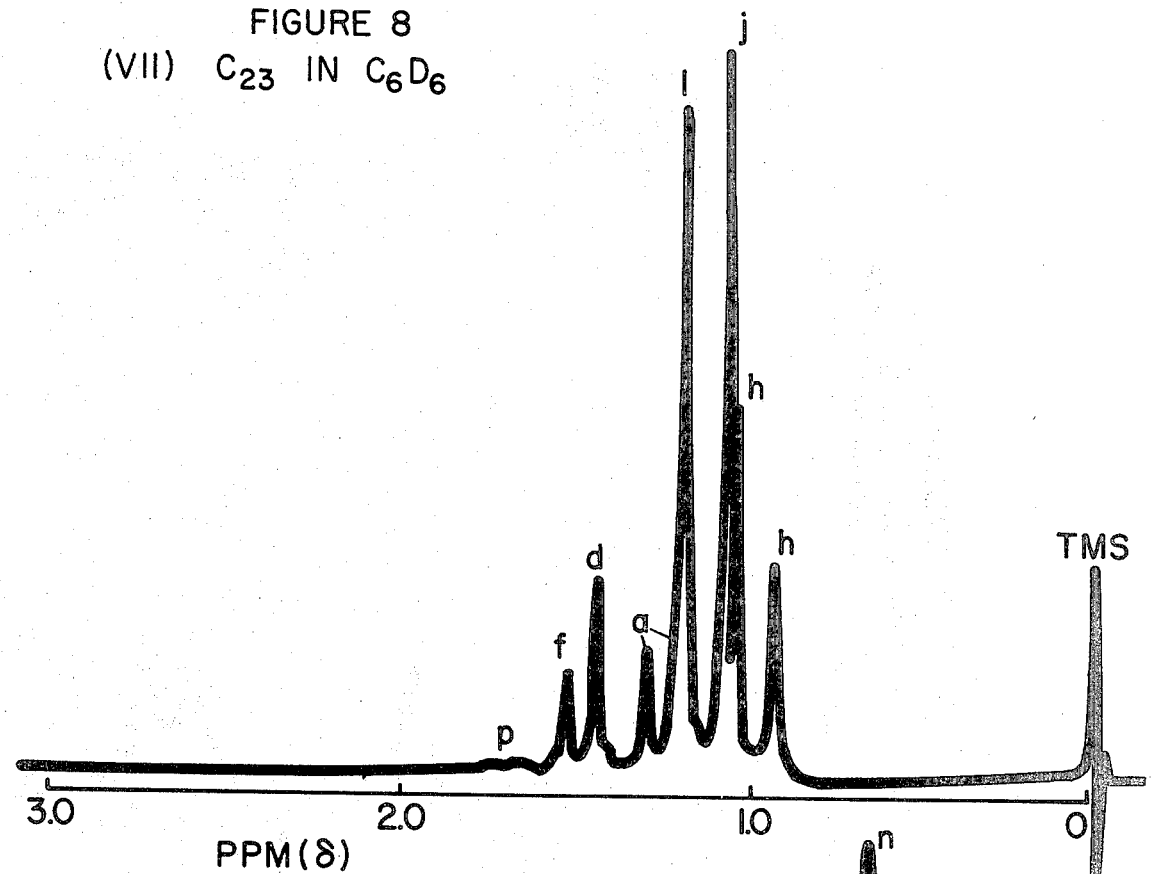
Figure 7:
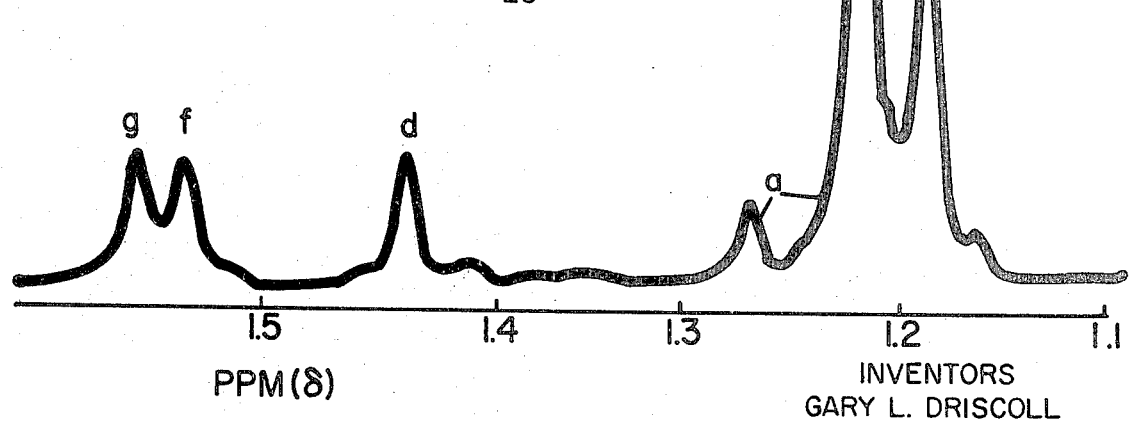
Figure 9:
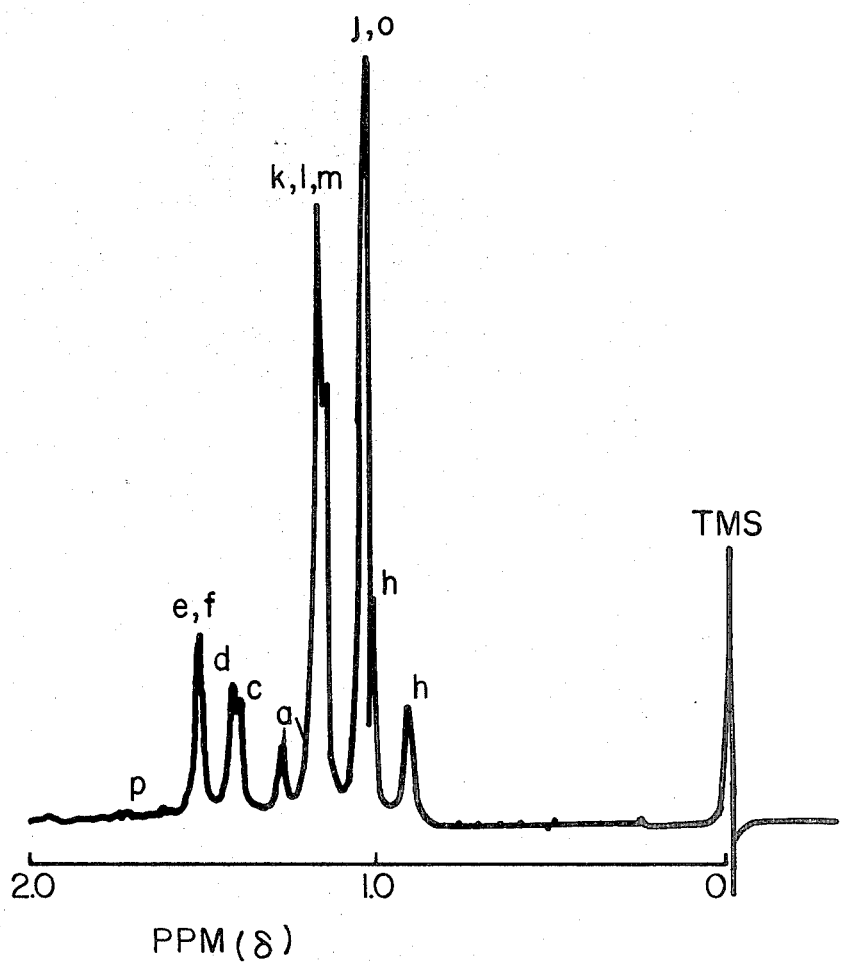
Figure 10:
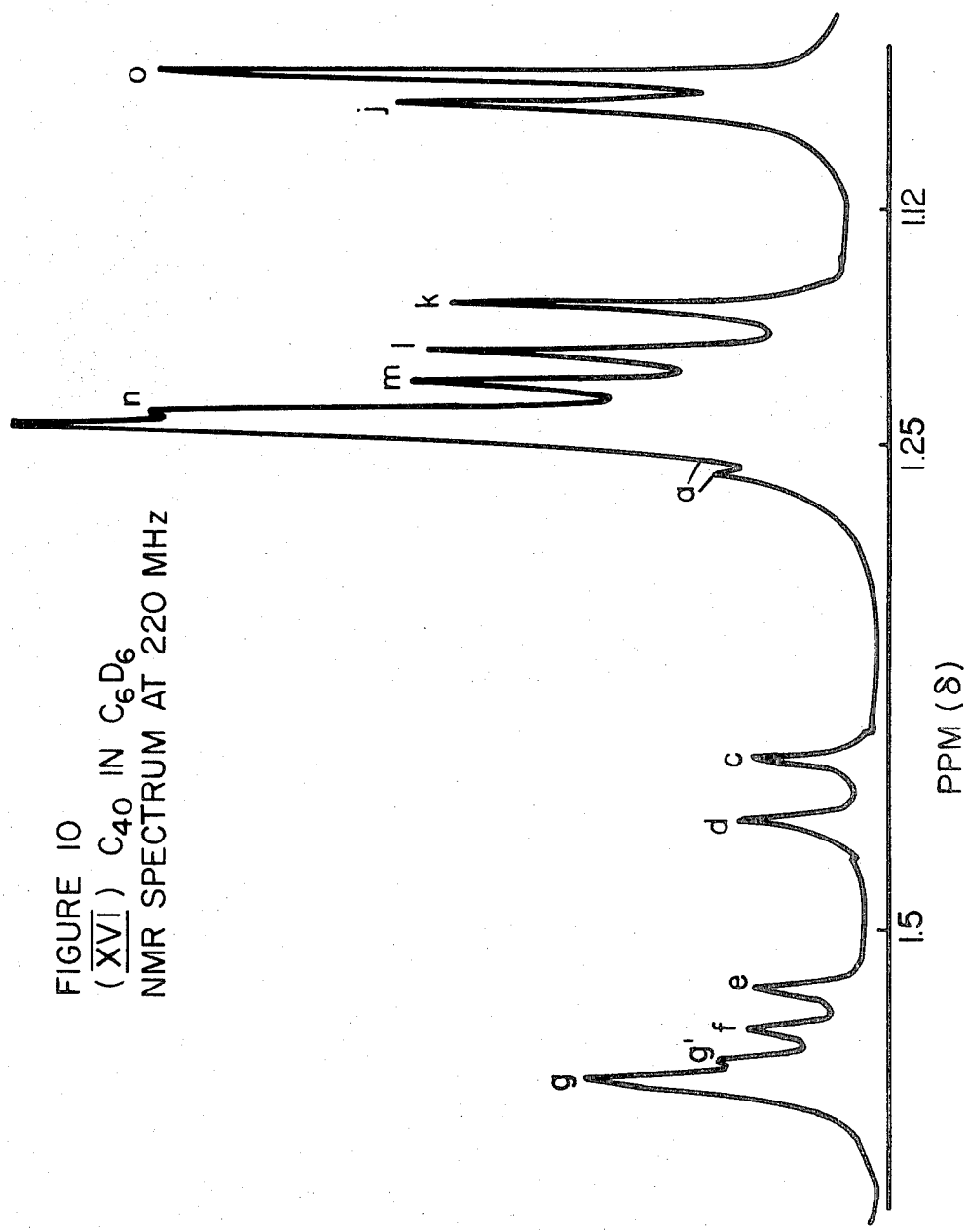

It should be noted that the NMR resonance positions of the same proton types are essentially the same in $CCl_4$ regardless of the species carbon number (see Tables II and III). The NMR spectra of the $C_{23}$ (VII) and $C_{24}$ (VIII) carbon number species in $C_6D_6$ solvent at 60 mHz. are shown, respectively, in FIGS. 8 and 9. The $C_6D_6$ spectrum of the symmetrical $C_{23}$ hydrocarbon shows a proton resonance singlet for the two identical terminal isolated methylene ($d$) at 86 Hz. (1.43 p.p.m.) and a single proton peak for the two equivalent maximally "crowded" geminal methyl groups ($l$) at 70 Hz. (1.18 p.p.m.). In the $C_6D_6$ spectrum of the $C_{24}$ species, the nonequivalent terminal methylenes ($c$) and ($d$) are split into an expected doublet peak at 84–85 Hz. (1.41–143 p.p.m.). In addition, the maximally "crowded" geminal methyl groups ($k$), ($l$), and ($m$) now appear as a distorted singlet, a single peak having two unresolved shoulder peaks. This strongly suggests that these three maximally "crowded" geminal methyl groups have different molecular environments, in this molecule, i.e., different degrees of "crowding." Although the proton resonance signal of the two maximally "crowded" methylenes ($e$) and ($f$) appear as a singlet in this spectrum (run at a sweep width of 500 Hz.), a perceptible amount of broadening was observed for this peak when the spectrum was run at a sweep width of 250 Hz. This peak broadening indicated that these methylene groups were also nonequivalent. NMR spectra of the $C_{27}$ to $C_{40}$ hydrocarbon species run at 60-mHz. and in $C_6D_6$ solvent provided additional data which suggested the possibility of differentiating between maximally "crowded" germinal methyl groups and between maximally "crowded" methylene groups by means of benzene-induced solvent shifts. The data implied that maximally "crowded" geminal methyl and maximally "crowded" methylene groups which have varying degrees of "crowding" are not identical and have different chemical shifts in an anisotropic solvent such as $C_6D_6$. The 100 mHz. spectra of the $C_{20}$, $C_{24}$, $C_{28}$, $C_{35}$, and $C_{36}$ hydrocarbon species confirm the magnetic nonequivalence of (1) the "crowded" terminal isolated methylene groups (c) and (d) in the nonsymmetrical species and (2) the maximally "crowded" geminal methyl and maximally "crowded" methylene groups which have different degrees of "crowding" in both the nonsymmetrical and symmetrical species. A summary of these proton resonance positions in $C_6D_6$ for the $C_{19}$ to $C_{40}$ hydrocarbon species are given in Table IV.

In the non-symmetrical, even carbon numbered species, relatively less proton "crowding" occurs in the carbon chain on the t-butyl end of the molecule than on the end terminated with the isopropyl group. Evidence for this is that (1) the proton resonance signal of the terminal "crowded" methylene group (c) is upfield from the proton signal of the "crowded" methylene group (d), (2) the proton resonance signal of the maximally "crowded" geminal methyl group (k) is upfield from the proton signal of the maximally "crowded" geminal methyl group (l) the proton resonance signal of the maximally "crowded" methylene group (e) is upfield from the resonance signal of the maximally "crowded" methylene group (f), and (4) the resonance signal of the "crowded" t-butyl group (o) appears at slightly higher field than the corresponding signal of the "crowded" internal geminal methyl group (j). It should be noted that, although these last two groups are not of the same type, their relative field position appears to be related to the degree of molecular "crowding" for the individual methyl protons. Fisher-Hirschfelder-Taylor models of these hydrocarbon species also suggest that the side of the molecule having the t-butyl group is the least "crowded." One such model of the $C_{20}$ species indicates that these compounds are very rigid, sausage shaped molecules having their geminal methyls oriented on one side of the chain and their methylene groups on the other. The $C_{20}$ model gives additional evidence for extreme "crowding" of the geminal methyl and methylene groups in these structures. This "crowding" severely hinders rotation of all of the groups involved with the exception of the terminal isopropyl and tertiary butyl groups which also are hindered, but to a lesser degree. These models also show significant molecular strain. Examination of the structures of the higher carbon numbered species clearly shows an increased "crowding" effect due to the additional number of maximally "crowded" geminal methyl and maximally "crowded" methylene groups in the center of the hydrocarbon chain. The increased "crowding" experienced by these groups causes a further downfield shift of their resonance peaks with the most "crowded" groups occurring at the lowest field positions of their respective geminal methyl and methylene categories. The 100-mHz. spectrum of the $C_{36}$ species illustrates this by showing four separate proton signals for the maximally "crowded" geminal methyl groups and three separate proton signals for the maximally "crowded" methylene groups. In each category the most "crowded" group occurs at the lowest field position. The 220-mHz. spectrum of the $C_{40}$ species shows four proton signals for both the maximally "crowded" geminal methyl groups and the maximally "crowded" methylene groups. There appears to be a distinct similarity between the proton resonance peak pattern of the maximally "crowded" geminal methyl groups and the maximally "crowded" methylene groups in this spectrum. In each of these NMR regions of these spectra, the proton resonance peaks of the most "crowded" groups are not completely resolved from one another and appear as broadened signals. Increased resolution of the 220-mHz. scan results in the appearance of the proton signal which has been assigned to the maximally "crowded" methylene group g, and shows partial resolution of the signal due to the maximally "crowded" geminal methyl groups designated by (n).

Solvent effects

Benzene-induced solvent shifts have been very useful in the structural determination of these novel nonpolar branched hydrocarbons and that solvent effects that have been observed are both unique and interesting. Only one detailed NMR study has been noted in the literature which involved aromatic solvent effects and saturated nonpolar hydrocarbons (Winkler and von Philipsborn, Helv. Chem. Acta 51, 183–190 (198)). These solvent effects are unique in that the solvent change from $CCl_4$ to $C_6D_6$ gives widely differing negative $\Delta$-values ($\Delta = \alpha CCl_4 - \alpha C_6D_6$) for terminal and centrally located protons and gives rise to magnetic nonequivalence of isolated methylene and geminal methyl protons which have different degrees of molecular "crowding." These values extend over the range $-0.02$ to $-0.15$ p.p.m. The solvent shift data which have been determined for these hydrocarbons are given in Table V and refer to hexadeuteriobenzene rather than benzene solutions.

The protons of the maximally "crowded" methylene and geminal methyl groups of the more rigid molecules which experience little rotation and have essentially fixed positions in space, i.e., have stereospecificity with respect to the entire solute molecule, show a constantly increasing induced solvent shift of significant magnitude toward a downfield direction which is over and above that observed for the terminal methyl protons of the same molecule.

The stereospecific solvation by benzene of these species is evidence of the unique nature of the novel hydrocarbons of the present invention. These hydrocarbon species are characterized by extremely "crowded" geminal methyl and methylene groups. The van der Waals repulsions occurring in the maximally "crowded" groups result in the creation of dipoles such that the "end on" approach of benzene is the preferred one. Therefore, these hydrocarbons behave much the same way as polar molecules by having protons which are located in regions of high electron density deshielded in benzene. This can be accounted for by the "end on" approach of benzene molecules to these high electron density regions (relative to a random approach). Analogous to this is the "end on" approach of benzene molecules to electron rich areas of dipoles which has been described for polar compounds.

These hydrocarbon molecules which are characterized by a high degree of branching and molecular "crowding," have not been previously reported in the literature. This homologous series of hydrocarbons make excellent reference compounds for evaluating empirical equations that have been used to calculate the isomeric variation in the values of physical properties of paraffin hydrocarbons. These equations involve only structural parameters. A comparison of the calculated refractive indices obtained from the calculated values of molal refraction and molal volume using the method of Greenshields and Rossini (infra) with the experimental refractive indices obtained for these hydrocarbon species indicates certain trends in the deviations between the calculated and observed values. The tabulated data in Table VI show that the $\Delta$ RI (calculated-observed) values become progressively larger, i.e., show greater positive deviations, as the species carbon number is increased. Lower values for the observed refractive indices indicate that the higher carbon numbered species, beginning with $C_{20}$, have increasingly higher molecular volumes than predicted by computation. Table VI shows positive deviations of 0.002 g./ml. for the densities of the $C_{35}$ and $C_{36}$ hydrocarbon species. The experimental molal volumes determined for these two species using the observed density values were respectively 1.3 and 1.5 ml./mole higher than the calculated molal volumes.

These deviations are above the average deviation in molal volumes. These deviations are above the average deviation in molal volume (±0.62 ml./mole) which was reported for a series of $C_{12}$ to $C_{30}$ hydrocarbons by Greenshields and Rossini.

Figure 2:
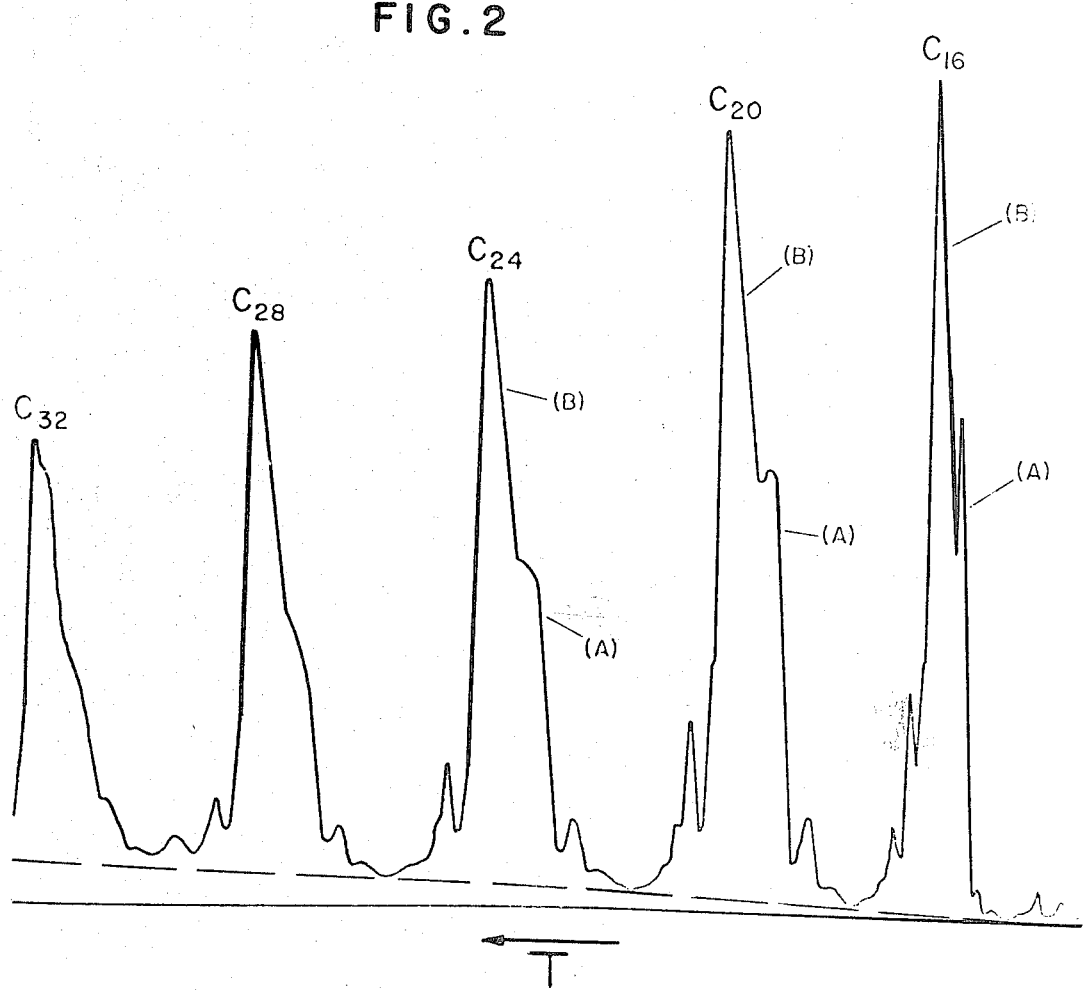

In the attached figures, FIG. 2 is a vapor phase chromatogram of a hydrogenated polybutene oil prepared by the process of the previously referred application of Driscoll, filed of even date herewith. The novel oils of the present invention can be obtained from this novel oil by the procedures described herein.

In the above-referred to process of Driscoll, isobutene is polymerized to form a polyisobutene oil having a viscosity in the range of 30–20,000 SUS at 100° F. and a viscosity index of from 90–130, using stannic chloride as the catalyst and various solvents such as nitromethane at from −30 to 100° C. and preferably from 0° C. to 50° C. The stannic chloride is present in from 0.5 to 40 and preferably 1 to 20 volume percent as based on the nitromethane present.

TABLE I
[Purity and Molecular Weight Data for Collected Fractions]

| Carbon No. | Purity a | Mo. wt. Calculated | Mo. wt. Observed b | Relative error, percent |
|---|---|---|---|---|
| 11 | 99+ | 156.3 | 161 | +3.0 |
| 12 | 97.5 | 170.3 | 177 | +3.9 |
| 15 | 99+ | 212.4 | 214 | +0.7 |
| 16 | 99+ | 226.4 | 219 | −2.8 |
| 19 | 99+ | 268.5 | 271 | +0.9 |
| 20 | 99.0 | 282.5 | 275 | −2.7 |
| 23 | 96.7 | 324.6 | 322 | −0.8 |
| 24 | 96.9 | 338.6 | 344 | +1.4 |
| 27 | 99+ | 380.7 | 377 | −1.0 |
| 28 | 99+ | 394.7 | 397 | +0.6 |
| 31 | 98.8 | 436.8 | 426 | −2.5 |
| 32 | 98.7 | 450.8 | 444 | −1.5 |
| 35 | 97.3 | 492.9 | 490 | −0.6 |
| 36 | 99+ | 507.0 | 513 | +1.2 |
| 39 | 99+ | 549.0 | 544 | −0.9 |
| 40 | 99+ | 563.1 | 570 | +1.2 | a Capillary gas chromatography.
b Vapor pressure osmometry.

TABLE II
[Summary of Methylene Resonance Positions in CCl₄]

| $CH_2$ type | Molecular structure | Designation | Resonance position Hz. | Resonance position P.p.m. | Multiplet |
|---|---|---|---|---|---|
| Uncrowded | −CH₂−C(CH₃)−H with CH₃ | a | 68, 73 | 1.13, 1.21 | d |
| Slightly crowded | −C(CH₃)−CH₂−C(CH₃)− with CH₃ groups | b* | 75 | 1.25 | s |
| Crowded | −C(CH₃)(CH₃)−CH₂− [−C(CH₃)(CH₃)−] | c, d | 80 | 1.33 | s |
| Maximally crowded | [−C(CH₃)(CH₃)−] CH₂ [−C(CH₃)(CH₃)−] | e, f, g | 85 | 1.42 | s |

*For $C_{12}$ and $C_{15}$ species only.
NOTES:
d = doublet; s = singlet.

$$\begin{bmatrix} CH_3 \\ -C- \\ CH_3 \end{bmatrix} = \text{maximally crowded geminal methyl group.}$$

TABLE III
[Summary of Methyl Resonance Positions in CCl₄]

| $CH_3$ type | Molecular structure | Designation | Resonance position Hz. | Resonance position P.p.m. | Multiplet |
|---|---|---|---|---|---|
| Isopropyl | H−C(CH₃)(CH₃) | h | 53, 59 | 0.88, 0.98 | d |
| Slightly crowded geminal | C(CH₃)(CH₃) | i* | 52.9 | 0.87 | s |
| Crowded geminal | C(CH₃)(CH₃) | j | 59–60 | 0.98–1.0 | s |
| Maximally crowded geminal | [C(CH₃)(CH₃)] | k, l, m, n | 65–66 | 1.08, 1.10 | s |
| t-Butyl | H₃C−C(CH₃)(CH₃)− | o | 59–60 | 0.93, 1.0 | s |

*For C11 species only; uncrowded geminals methyls occur at 48.5–50 Hz. (0.81–0.83 p.p.m.); see Ref. 6.

NOTE.—d = doublet; s = singlet.

TABLE IV

[Summary of resonance positions [a] for crowded methylene and gemina methyl groups in $C_6D_6$]

| Carbon No. | | Maximally crowded $CH_2$ | | | Crowded terminal $CH_2$ | | Maximally crowded geminal $CH_3$ | | | |
|---|---|---|---|---|---|---|---|---|---|---|
| | | e | f | g | c | d | k | l | m | n |
| $C_{19}$[c] | (V) | | | | | 1.39 | | 1.14 | | |
| $C_{20}$ | (VI) | 1.48 | | | 1.39 | 1.41 | 1.15 | 1.16 | | |
| $C_{23}$ | (VII) | | 1.52 | | | 1.43 | | 1.18 | | |
| $C_{24}$ | (VIII) | 1.52 | 1.53 | | 1.41 | 1.43 | 1.17 | 1.18 | 1.20 | |
| $C_{27}$ | (IX) | | 1.52 | | | 1.43 | | 1.18 | 1.20 | |
| $C_{28}$ | (X) | 1.52 | 1.54 | 1.55 | 1.41 | 1.44 | 1.17 | 1.19 | 1.20 | 1.21 |
| $C_{31}$ | (XI) | | 1.54 | 1.56 | | 1.44 | | 1.20 | | 1.22 |
| $C_{32}$ | (XII) | 1.53 | 1.54 | 1.56 | 1.42 | 1.44 | 1.17 | 1.20 | 1.21 | 1.23 |
| $C_{35}$ | (XIII) | | 1.55 | 1.57 | | 1.45 | | 1.20 | | 1.23 |
| $C_{36}$ | (XIV) | 1.53 | 1.55 | 1.57 | 1.42 | 1.45 | 1.18 | 1.20 | 1.22 | 1.23 |
| $C_{39}$ | (XV) | | 1.56 | 1.58 | | 1.45 | | 1.21 | | [d]1.24 |
| $C_{40}$ | (XVI) | 1.54 | 1.56 | 1.58 | 1.42 | 1.45 | 1.18 | 1.21 | 1.22 | [d]1.24 and 1.57 (g')[b] |

[a] Measured in p.p.m. from 100-mHz. spectra using TMS as internal standard.
[b] Resolved in 220-mHz. scan only.
[c] Run at 60-mHz. only.
[d] Broad signal.

TABLE V

[Solvent shifts—$\Delta(\delta CCl_4 - \Delta C_6D_6$, p.p.m.)[a]]

| Carbon No. | Maximally crowded $CH_2$ | Maximally crowded geminal $CH_3$ | $(CH_3)_2CH$ | $(CH_3)_3C$ |
|---|---|---|---|---|
| 11 | | | 0 | |
| 12 | | | 0 | 0 |
| 16[b] | | −0.02 | −0.02 | −0.02 |
| 19 | | −0.04 | −0.02 | |
| 20 | −0.06 | −0.06 | −0.03 | −0.04 |
| 23 | −0.10 | −0.08 | −0.04 | |
| 24 | −0.10 | −0.10 | −0.04 | −0.05 |
| 27 | −0.11 | −0.10 | −0.04 | |
| 28 | −0.13 | −0.11 | −0.04 | −0.05 |
| 31 | −0.14 | −0.12 | −0.04 | |
| 32 | −0.14 | −0.13 | −0.04 | −0.05 |
| 35 | −0.15 | −0.13 | −0.04 | |
| 36 | −0.15 | −0.13 | −0.04 | −0.06 |
| 39 | −0.16 | [c]−0.14 to −0.15 | −0.04 | |
| 40 | −0.16 | [c]−0.14 to −0.15 | −0.04 | −0.06 |
| 1800[d] | −0.18 | −0.18 | | |

[a] 0.1 to 0.3 M solutions.
[b] No appreciable solvent shift observed.
[c] Broad peak.
[d] Polyisobutylene; carbon number based on number-average molecular weight.

TABLE IV

[Physical property data]

| Carbon No. | Calculated[a] R.I. 25° C. | Observed R.I. 25° C. | Δ R.I. (calc.-obs.) | Calculated[b] density 25° C. |
|---|---|---|---|---|
| 11 | 1.4143 | 1.4165 | −0.0022 | .7375 |
| 12 | 1.4254 | 1.4257 | −0.0003 | .7561 |
| 15 | 1.4380 | 1.4380 | | .7816 |
| 16 | 1.4460 | 1.4441 | +0.0019 | .7942 |
| 19 | 1.4533 | 1.4530 | +0.0003 | .8092 |
| 20 | 1.4592 | 1.4564 | +0.0028 | .8185 |
| 23 | 1.4636 | 1.4615 | +0.0021 | .8282 |
| 24 | 1.4684 | 1.4648 | +0.0036 | .8355 |
| 27 | 1.4713 | 1.4679 | +0.0034 | .8415 |
| 28 | 1.4753 | 1.4704 | +0.0049 | .8479 |
| 31 | 1.4772 | 1.4725 | +0.0047 | .8525 |
| 32 | 1.4805 | 1.4750 | +0.0055 | .8575 |
| 35 | 1.4814 | 1.4768 | +0.0050 | [c].8607 |
| 36 | 1.4849 | 1.4780 | +0.0069 | [d].8651 |
| 39 | 1.4856 | 1.4798 | +0.0058 | .8674 |
| 40 | 1.4881 | 1.4815 | +0.0066 | .8712 |

[a] See reference (3).
[b] From calculated value of molal volume at 25° C.
[c] Observed value=.8584.
[d] Observed value=.8631.

TABLE VII

[Typical NMR integral data[a] for $C_{27}$ and $C_{28}$ species]

| | $C_{27}$ | | | $C_{28}$ | |
|---|---|---|---|---|---|
| Assignment | H's calc. | H's exp. | Assignment | H's calc. | H's exp. |
| h, j | 24 | 24.3 | h, j, o | 21 | 22.2 |
| l, m | 18 | 18.2 | k, l, m, n | 24 | 23.3 |
| a | 4 | 3.8 | a | 2 | 1.9 |
| d | 4 | 3.8 | c, d | 4 | 3.9 |
| f | 4 | 3.9 | e, f, g | 6 | 5.8 |
| p | 2 | 2 | p | 1 | 0.9 |

[a] Utilizing A-60 electronic integrator; spectra run in $CCl_4$.

TABLE VIII

[Summary of maximally crowded groups in $C_{16}$ to $C_{40}$ species]

| Carbon No. | No. of $(CH_3)_2CH$ | No. of $(CH_3)_3C$ | Center[a] of symmetry | No. max. crowded gem. $CH_3$'s | No. max. crowded $CH_2$'s |
|---|---|---|---|---|---|
| 16 | 1 | 1 | None | 1 | 0 |
| 19 | 2 | 0 | Gem. $CH_3$ | 1 | 0 |
| 20 | 1 | 1 | None | 2 | 1 |
| 23 | 2 | 0 | $CH_2$ | 2 | 1 |
| 24 | 1 | 1 | None | 3 | 2 |
| 27 | 2 | 0 | Gem. $CH_3$ | 3 | 2 |
| 28 | 1 | 1 | None | 4 | 3 |
| 31 | 2 | 0 | $CH_2$ | 4 | 3 |
| 32 | 1 | 1 | None | 5 | 4 |
| 35 | 2 | 0 | Gem. $CH_3$ | 5 | 4 |
| 36 | 1 | 1 | None | 6 | 5 |
| 39 | 2 | 0 | $CH_2$ | 6 | 5 |
| 40 | 1 | 1 | None | 7 | 6 |

[a] Symmetrical about maximally crowded geminal $CH_3$ or maximally crowded $CH_2$.

The invention claimed is:

1. A branched paraffin hydrocarbon having a purity of at least 90 weight percent, having 16, 19, 20, 23, 24, 27, 28, 31, 32, 35, 36, 39 or 40 carbon atoms, and containing at least one pair of maximally crowded geminal methyl groups, said hydrocarbon having the formula:

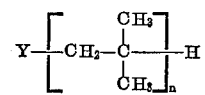

wherein $n$ is an integer from 3 to 9 inclusive, and wherein Y is:

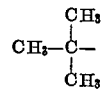

when said hydrocarbon has an even number of carbon atoms, and Y is:

when said hydrocarbon has an odd number of carbon atoms.

2. A branched paraffin hydrocarbon according to claim 1 wherein at least one of the methylene groups of said hydrocarbon is maximally crowded.

3. A branched paraffin hydrocarbon according to claim 1 which corresponds to the formula:

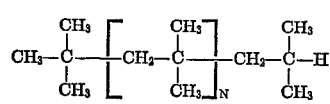

where N is 2 to 8.

4. A branched paraffin hydrocarbon according to claim 1 having an even number of carbon atoms and a crowded tertiary butyl group.

5. A branched paraffin hydrocarbon according to claim 1 having an odd number of carbon atoms and terminal isolated crowded methylene groups, said hydrocarbon being symmetrical about a central carbon atom containing a maximally crowded geminal methyl group.

6. A branched paraffin hydrocarbon according to claim 2 and having an even number of at least 20 carbon atoms.

7. A branched paraffin hydrocarbon according to claim 1 having 16 or 20 carbon atoms and non-equivalent terminal isolated methylene groups.

8. A branched paraffin hydrocarbon according to claim 1 which contains at least 23 carbon atoms and which has an odd number of carbon atoms, is terminated with two isopropyl groups and is symmetrical about either (i) a central carbon atom containing a maximal crowded geminal methyl group or (ii) a maximally crowded methylene.

9. A branched paraffin hydrocarbon according to claim 1 which contains an even number of at least 24 carbon atoms, is terminated with both an isopropyl group and a tertiary butyl group and which does not have a center of symmetry.

References Cited

UNITED STATES PATENTS

| 3,666,827 | 5/1972 | Carlson et al. | 260—676 |
|---|---|---|---|
| 3,576,898 | 4/1971 | Blake et al. | 260—683.15 B |
| 2,403,779 | 7/1946 | Bailey | 260—683.15 B |
| 2,085,535 | 6/1937 | Langedijk et al. | 260—683.15 B |
| 2,076,201 | 6/1937 | Langedijk et al. | 260—683.15 B |

OTHER REFERENCES

A Free Radical Method of Synthesis of Hydrocarbon With Several Quaternary Carbon Atoms in the Molecules, Chemical Abstracts, vol. 64, 1966, p. 15774h, A. P. Neshcheryakou and E. I. Erzyutova.

DELBERT E. GANTZ, Primary Examiner

J. M. NELSON, Assistant Examiner

U.S. Cl. X.R.

208—19; 260—683.15